United States Patent
Krishan et al.

(10) Patent No.: US 10,791,044 B1
(45) Date of Patent: Sep. 29, 2020

(54) METHODS, SYSTEM, AND COMPUTER READABLE MEDIA FOR HANDLING MULTIPLE VERSIONS OF SAME SERVICE PROVIDED BY PRODUCER NETWORK FUNCTIONS (NFS)

(71) Applicant: Oracle International Corporation, Redwood Shores, CA (US)

(72) Inventors: Rajiv Krishan, Bangalore (IN); Milind Pandey, Bengaluru (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/369,691

(22) Filed: Mar. 29, 2019

(51) Int. Cl.
*H04L 12/26* (2006.01)
*H04L 12/24* (2006.01)
*H04L 12/803* (2013.01)

(52) U.S. Cl.
CPC .......... *H04L 43/50* (2013.01); *H04L 41/5019* (2013.01); *H04L 41/5096* (2013.01); *H04L 47/125* (2013.01)

(58) Field of Classification Search
None
See application file for complete search history.

(56) References Cited

U.S. PATENT DOCUMENTS

| | | |
|---|---|---|
| 8,023,482 B2 | 9/2011 | Gong et al. |
| 8,300,637 B1 | 10/2012 | Bennett, III et al. |
| 8,879,431 B2 | 11/2014 | Ridel et al. |
| 8,954,080 B2 | 2/2015 | Janakiraman et al. |
| 10,285,155 B1 | 5/2019 | Dodd-Noble et al. |

(Continued)

FOREIGN PATENT DOCUMENTS

| | | |
|---|---|---|
| WO | WO 2018/174021 A1 | 9/2018 |
| WO | WO 2018/174516 A1 | 9/2018 |

(Continued)

OTHER PUBLICATIONS

Commonly-assigned, co-pending U.S. Appl. No. 16/527,988 for "Methods, Systems, and Computer Readable Media for Network Function (NF) Topology Synchronization," (Unpublished, filed Jul. 31, 2019).

(Continued)

*Primary Examiner* — Brian Whipple
(74) *Attorney, Agent, or Firm* — Jenkins, Wilson, Taylor & Hunt, P.A.

(57) ABSTRACT

A method for handling multiple instances of a service provided by one or more producer network functions (NFs) includes, at a service based architecture (SBA) platform including at least one processor and a memory, obtaining first and second application programming interface (API) version indicators associated with first and second service instances implemented by one or more producer NFs. The method further includes decoding the first and second API version indicators. The method further includes detecting, based on results of the decoding, multiple instances of the same service and that a first service instance is backward compatible with a second service instance. The method further includes implementing canary testing of the first service instance.

20 Claims, 9 Drawing Sheets

(56) References Cited

U.S. PATENT DOCUMENTS

| | | | |
|---|---|---|---|
| 2011/0078674 A1* | 3/2011 | Ershov | G06F 11/3604 |
| | | | 717/170 |
| 2013/0029708 A1 | 1/2013 | Fox et al. | |
| 2013/0039176 A1 | 2/2013 | Kanode et al. | |
| 2014/0379901 A1* | 12/2014 | Tseitlin | H04L 41/5096 |
| | | | 709/224 |
| 2015/0016266 A1 | 1/2015 | Dumitrescu et al. | |
| 2015/0039560 A1 | 2/2015 | Barker et al. | |
| 2015/0110000 A1 | 4/2015 | Zhang et al. | |
| 2015/0263987 A1 | 9/2015 | Klein et al. | |
| 2016/0142324 A1 | 5/2016 | Vihtari et al. | |
| 2016/0164788 A1 | 6/2016 | Goel et al. | |
| 2016/0315743 A1 | 10/2016 | Nagaraj et al. | |
| 2016/0352588 A1 | 12/2016 | Subbarayan et al. | |
| 2018/0039494 A1* | 2/2018 | Lander | H04L 63/0815 |
| 2018/0159780 A1 | 6/2018 | Essigmann et al. | |
| 2018/0262592 A1 | 9/2018 | Zandi et al. | |
| 2018/0343567 A1 | 11/2018 | Ashrafi | |
| 2019/0191467 A1 | 6/2019 | Dao et al. | |
| 2019/0261244 A1 | 8/2019 | Jung et al. | |
| 2019/0313437 A1 | 10/2019 | Jung et al. | |
| 2019/0313469 A1 | 10/2019 | Karampatsis et al. | |
| 2019/0335534 A1 | 10/2019 | Atarius et al. | |
| 2019/0342921 A1 | 11/2019 | Loehr et al. | |
| 2019/0349901 A1 | 11/2019 | Basu Mallick et al. | |
| 2019/0357092 A1 | 11/2019 | Jung et al. | |
| 2019/0394624 A1 | 12/2019 | Karampatsis et al. | |
| 2020/0008069 A1 | 1/2020 | Zhu et al. | |
| 2020/0045753 A1 | 2/2020 | Dao et al. | |
| 2020/0045767 A1 | 2/2020 | Velev et al. | |
| 2020/0053670 A1 | 2/2020 | Jung et al. | |
| 2020/0053724 A1 | 2/2020 | Molavianjazi et al. | |

FOREIGN PATENT DOCUMENTS

| | | |
|---|---|---|
| WO | WO 2019/062596 A1 | 4/2019 |
| WO | WO 2019/076273 A1 | 4/2019 |

OTHER PUBLICATIONS

"3rd Generation Partnership Project; Technical Specification Group Core Network and Terminals; 5G System; Network Function Repository Services; Stage 3 (Release 15)," 3GPP TS 29.510, V15.4.0, pp. 1-127 (Jun. 2019).

"3rd Generation Partnership Project; Technical Specification Group Network and Terminals; 5G Systems; Principles and Guidelines for Services Definition; Stage 3 (Release 15)", 3GPP TS 29.501, V15.2.0, pp. 1-66 (Dec. 2018).

"3rd Generation Partnership Project; Technical Specification Group Services and System Aspects; Study on Enhancements to the Service-Based Architecture (Release 16)", 3GPP TR 23.742, V16.0.0, pp. 1-131 (Dec. 2018).

"5G; 5G System; Network function repository services; Stage 3 (3GPP TS 29.510 version 15.1.0 Release 15)," ETSI TS 129 510, V15.1.0, pp. 1-87 (Oct. 2018).

"5G; 5G System; Unified Data Repository Services; Stage 3 (3GPP TS 29.504 version 15.1.0 Release 15)," ETSI TS 129 504, V15.1.0, pp. 1-26 (Oct. 2018).

Mayer, "RESTful APIs for the 5G Service Based Architecture," Journal of ICT, vol. 6_1&2, pp. 101-116 (2018).

"5G Service Based Architecture (SBA)," 5G, pp. 1-61 (downloaded Dec. 24, 2018).

Commonly-assigned, co-pending U.S. Appl. No. 16/280,672 for Methods, Systems, and Computer Readable Media for (IoT) Device State Through Service Capability Exposure Function (SCEF) (Unpublished, filed Feb. 20, 2019).

"3rd Generation Partnership Project; Technical Specification Group Network and Terminals; 5G Systems; Network Function Repository Services; Stage 3 (Release 15)", 3GPP TS 29.510, V15.2.0, pp. 1-113 (Dec. 2018).

"3rd Generation Partnership Project; Technical Specification Group Radio Access Network; Evolved Universal Terrestrial Radio Access Network (E-UTRAN); S1 Application Protocol (S1AP) (Release 15)," 3GPP TS 36.413, V15.4.0, pp. 1-383 (Dec. 2018).

"3rd Generation Partnership Project; Technical Specification Group Core Network and Terminals; Mobility Management Entity (MME) and Serving GPRS Support Node (SGSN) interfaces for interworking with packet data networks and applications (Release 15)," 3GPP TS 29.128, V15.4.0, pp. 1-52 (Dec. 2018).

"3rd Generation Partnership Project; Technical Specification Group Core Network and Terminals; T8 reference point for Northbound APIs; (Release 15)," 3GPP TS 29.122, V15.2.0, pp. 1-297 (Dec. 2018).

"Diameter Signaling Router SCEF User's Guide," Release 8.3, E93572, Oracle® Communications, pp. 1-110 (Sep. 2018).

"3rd Generation Partnership Prject; Technical Specification Group Services and System Aspects; Universal Geographical Area Description (GAD) (Release 15)," 3GPP TS 23.032, pp. 1-32 (Sep. 2018).

"3rd Generation Partnership Project; Technical Specification Group Services and System Aspects; Architecture enhancements to facilitate communications with packet data networks and applications (Release 15)," 3GPP TS 23.682, V15.2.0, pp. 1-122 (Sep. 2017).

Mayer, Georg (Huawei) "3GPP 5G CoreNetwork Status", 3GPP A Global Initiative, pp. 1-23 (Nov. 2017).

Preston-Werner, "Semantic Versioning 2.0.0", Oracle, pp. 1-5 (Jun. 2013).

Applicant-Initiated Interview Summary for U.S. Appl. No. 16/176,920 (dated Apr. 1, 2020).

Non-Final Office Action for U.S. Appl. No. 16/176,920 (dated Mar. 6, 2020).

Notification of Transmittal of the International Search Report and the Written Opinion of the International Searching Authority, or the Declaration for International Application Serial No. PCT/US2019/053912 (dated Dec. 18, 2019).

Commonly-assigned, co-pending U.S. Appl. No. 16/697,021 for "Methods, Systems, and Computer Readable Media for Diameter-Peer-Wide Egress Rate Limiting at Diameter Relay Agent (DRA)," (Unpublished, filed Nov. 27, 2019).

Notice of Allowance and Fee(s) Due for U.S. Appl. No. 16/280,672 (dated Sep. 25, 2019).

"3rd Generation Partnership Project; Technical Specification Group Services and System Aspects; Architecture enhancements to facilitate communications with packet data networks and applications (Release 16)," 3GPP TS 23.682, V16.4.0, pp. 1-30 (Sep. 2019).

"Diameter and Diameter Applications," Alcatel-Lucent, http://infodoc.alcatel-lucent.com/html/0_add-h-f/93-0098-HTML/7750_SR_OS_Triple_Play_Guide/GX-PolicyMgmt.html, pp. 1-40 (Aug. 22, 2019).

"3rd Generation Partnership Project; Technical Specification Group Radio Access Network; NG-RAN; NG Application Protocol (NGAP) (Release 15)," 3GPP TS 38.413, V15.4.0, pp. 1-328 (Jul. 2019).

Commonly-assigned, co-pending U.S. Appl. No. 16/453,955 for "Methods, Systems, and Computer Readable Media for Producer Network Function (NF) Service Instance Wide Egress Rate Limiting at Service Communication Proxy (SCP)," (Unpublished, filed Jun. 26, 2019).

"3rd Generation Partnership Project; Technical Specification Group Core Network and Terminals; 5G System; Restoration Procedures (Release 16)," 3GPP TS 23.527, V16.0.0, pp. 1-19 (Jun. 2019).

"3rd Generation Partnership Project; Technical Specification Group Core Network and Terminals; Numbering, addressing and identification (Release 15)," 3GPP TS 23.003, V15.7.0, pp. 1-131 (Jun. 2019).

"Class of Service Feature Guide (Routers and EX9200 Switches)," Junos® OS, Juniper Networks, pp. 1-1530 (Apr. 10, 2019).

"3rd Generation Partnership Project; Technical Specification Group Services and System Aspects; System Architecture and 5G; Stage 2 (Release 16)," 3GPP TS 23.501, V16.0.0, pp. 1-318 (Mar. 2019).

Penttinen, "5G Explained: Security and Deployment of Advanced Mobile Communications," Chapter 6, Section 6.3.8 NRF, 2 pages (Feb. 2019).

"Oracle Communications Diameter Signaling Router," Release Notice, Release 8.3, E93179 Revision 02, Oracle, pp. 1-98 (Dec. 2018).

(56) References Cited

OTHER PUBLICATIONS

Commonly-assigned, co-pending U.S. Appl. No. 16/176,920 for "Methods, Systems, and Computer Readable Media for Providing a Service Proxy Function in a Telecommunications Network Core Using a Service-Based Architecture," (Unpublished, filed Oct. 31, 2018).
"Addressing 5G Network Function Requirements," Intel® FPGAs and Intel PAC 5G QoS and IPSec Benchmarking. White Paper, pp. 1-8 (Oct. 2018).
"CPS vDRA Configuration Guide," Release 18.3.0 (Restricted Release)(1), Cisco, pp. 1-130 (Sep. 14 2018).
"How To Do Rate Limiting of Diameter Messages Using NetScaler," Citrix Systems Inc., pp. 1-3 (Sep. 4, 2018).
"5G; 5G System; Technical Realization of Service Based Architecture; Stage 3 (3GPP TS 29.500 version 15.0.0 Release 15)," ETSI TS 129 500, V15.0.0, pp. 1-29 (Jul. 2018).
"3rd Generation Partnership Project; Technical Specification Group Services and System Aspects; Study on Enhancements to the Service-Based Architecture (Release 16)," 3GPP TR 23.742, V0.3.0, pp. 1-64 (Jul. 2018).
"3rd Generation Partnership Project; Technical Specification Group Services and System Aspects; Study on Enhancements to the Service-Based Architecture (Release 16)," 3GPP TR 23.742, V0.2.0, pp. 1-39 (Jun. 2018).
"5G; Procedures for the 5G System (3GPP TS 23.502 version 15.2.0 Release 15)," ETSI TS 123 502 V15.2.0, pp. 1-46 (Jun. 2018).
"Cisco Ultra 5G Packet Core Solution," Cisco, White paper, https://www.cisco.com/c/dam/en/us/products/collateral/routers/network-convergence-system-500-series-routers/white-paper-c11-740360.pdf, pp. 1-11 (2018).
Scholl et al., "An API First Approach to Microservices Development," Oracle, https://blogs.oracle.com/developers/an-api-first-approach-to-microservices-development, pp. 1-12 (Nov. 8, 2017).
Brown et al., "Service-Based Architecture for 5G Core Networks," Huawei, Heavy Reading, https://www.3g4g.co.uk/5G/5Gtech_6004_2017_11_Service-Based-Architecture-for-5G-Core-Networks_HR_Huawei.pdf, pp. 1-12 (Nov. 2017).
"3rd Generation Partnership Project; Technical Specification Group Services and System Aspects; System Architecture for the 5G System; Stage 2 (Release 15)," 3GPP TS 23.501, V1.5.0, pp. 1-170 (Nov. 2017).
"Pseudo-CR on Service Discovery and Registration using NRF service," Ericsson, 3GPP TSG CT4 Meeting #79. 3GPP TR 29.891—v0.3.0. pp. 1-4 (Aug. 21-25, 2017).
Carlton et al., "HTTP and DNS in a 5G World," https://www.computerworld.com/article/3204594/http-and-dns-in-a-5g-world.html, pp. 1-5 (Jun. 30, 2017).
Benacer et al., "A High-Speed Traffic Manager Architecture for Flow-Based Networking," pp. 1-4 (2017).
Bormann et al., "Block-Wise Transfers in the Constrained Application Protocol (CoAP)," RFC 7959, pp. 1-37 (Aug. 2016).
"Dynamically Reconfigurable Optical-Wireless Backhaul/Fronthaul with Cognitive Control Plane for Small Cells and Cloud-RANs: D3.1 Analysis of state of the art on scalable control plane design and techniques for user mobility awareness. Definition of 5G-XHaul control plane requirements," European Commission, 5G-XHaul, pp. 1-107 (Jun. 31, 2016).
"Multi-Layer Security Protection for Signaling Networks," Oracle Communications, Oracle white paper, pp. 1-9 (Jan. 2016).
Kantola et al., "Policy-based communications for 5G mobile with customer edge switching," Security and Communication Networks, vol. 9, pp. 3070-3082 (2016).
Fajardo et al., "Diameter Based Protocol," Internet Engineering Task Force (IETF) Request for Comments: 6733, pp. 1-152 (Oct. 2012).
Gulbrandsen et al, "A DNS RR for specifying the location of services (DNS SRV)," RFC 2782, pp. 1-12 (Feb. 2000).

\* cited by examiner

METHODS, SYSTEM, AND COMPUTER READABLE MEDIA FOR HANDLING MULTIPLE VERSIONS OF SAME SERVICE PROVIDED BY PRODUCER NETWORK FUNCTIONS (NFS)

TECHNICAL FIELD

The subject matter described herein relates to routing traffic to NFs. More particularly, the subject matter described herein relates to methods, systems, and computer readable media for handling multiple versions of the same service provided by producer NFs.

BACKGROUND

In the 5G network architecture specified by the Third Generation Partnership Project (3GPP), the network function (NF) repository function (NRF) is the network entity that maintains the NF profile of available NF instances and their supporting services. The NRF also allows other NF instances to subscribe to and be notified regarding the registration in the NRF of new/update NF instances of a given type. The NRF supports service discovery functions by receiving NF discovery requests and providing available information about NF functions. NF functions are the nodes in the 5G system architecture that provide services, in the case of producer NFs, and that consume services, in the case of consumer NFs. The same NF may be both a producer NF and a consumer NF if the NF both consumes and provides services.

Figure 1:
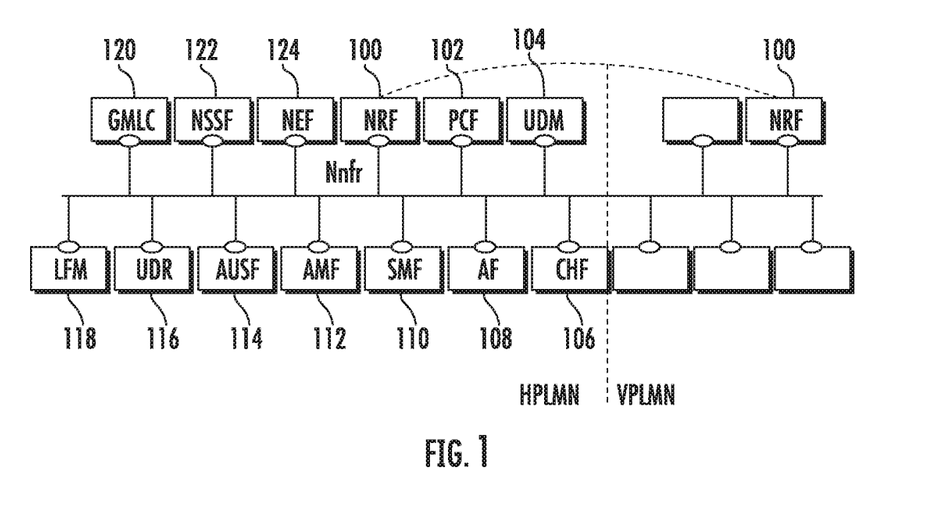
FIG. 1 is a network diagram illustrating an exemplary 5G network architecture.

FIG. 1 is a block diagram illustrating an exemplary 5G system network architecture. The architecture in FIG. 1 includes NRFs 100 located in the home public land mobile network (HPLMN) and visited public land mobile network (VPLMN). In FIG. 1, any of the nodes besides NRFs 100 can be either consumer NFs or producer NFs, depending on whether they are requesting or receiving services. In the illustrated example, the nodes include a policy control function (PCF) 102 that performs policy related operations in a network, a user data management (UDM) function 104 that manages user data, a charging function (CHF) 106 that performs charging operations, and an application function 108 that provides application services. The nodes illustrated in FIG. 1 further include a session management function (SMF) 110 that manages sessions between access and mobility management function (AMF) 112 and PCF 102. AMF 112 performs mobility management operations, similar to those performed by a mobility management entity (MME) in 4G networks. An authentication server function (AUSF) 114 performs authentication services for user equipment (UEs) seeking access to the network. A user data repository (UDR) stores configuration information regarding user devices. A location management function (LMF) 118 provides location related services for user devices. A gateway mobile location center (GMLC) 120 stores location information for UEs and responds to location queries. A network slice selection function (NSSF) 122 provides network slicing services for devices seeking to access specific network capabilities and characteristics associated with a network slice. A network exposure function (NEF) 124 provides application programming interfaces (APIs) for application functions seeking to obtain information about Internet of things (IoT) devices and other UEs attached to the network.

As stated above, producer NFs register with the NRF to indicate the type of services that producer NFs provide. Producer NFs can register capacity and priority information with the NRF. Consumer NFs can discover producers that have registered to provide a specific service and can use the capacity and priority information to select a producer NF.

Network operators may desire to deploy multiple instances of the same service provided by a producer NF. For example, a network operator may deploy a producer NF with two separate service instances—one with an existing software version and another with a new software version to provide a given service. The purpose of such a deployment is to test how the new service instance responds to live network traffic.

One problem with such a deployment is that consumer NFs may not be equipped to handle the case where a producer NF has multiple instances of the same service. For example, the consumer NF may not include logic as to how to select one of the service instances when the consumer NF determines that the producer NF implements multiple instances of the same service.

Accordingly, there exists a need for methods, systems, and computer readable media for handling multiple versions of the same service provided by one or more producer NFs.

SUMMARY

A method for handling multiple instances of a service provided by one or more producer network functions (NFs) includes, at a service based architecture (SBA) platform, which may be, for example a 5G proxy, a service communication proxy (SCP), a security protection proxy (SEPP), or any other 5G nodes (as defined in 3GPP release 16). The SBA platform may include at least one processor and a memory, obtaining first and second application programming interface (API) version indicators associated with first and second service instances implemented by one or more producer NFs. The method further includes decoding the first and second API version indicators. The method further includes detecting, based on results of the decoding, multiple instances of the same service and that a first service instance is backward compatible with a second service instance. The method further includes implementing canary testing of the first service instance.

This procedure can be executed on any consumer NF in 5G architecture, intermediate smart 5G proxies, or other 5G nodes like the SCP or SEPP (as defined in 3GPP release 16). However, enabling this enhancement at intermediate smart 5G proxies, such as an SCP or SEPP, is preferred as it enable support of multiple handling in 5G architecture without disturbing client NF functionality. An SCP is a smart 5G proxy that can reside between a producer and a consumer NF. An SEPP is a security node that provides the control plane interconnect between home and visited networks.

The term "canary testing" in the context of testing NF-provided services refers to testing a newer version of a service by sending a portion of live service traffic to the newer version of the service and monitoring the results of the testing. If the newer version is able to handle the portion of live service traffic without error, the portion of service traffic allocated to the newer version of the service instance may be gradually increased until a desired proportion of the live service traffic is handled by the newer version of the service instance.

According to another aspect of the subject matter described herein, obtaining the first and second API version indicators includes sending a message to an NRF and receiving the first and second API version indicators from the NRF in a message received from the NRF.

According to yet another aspect of the subject matter described herein, decoding the first and second API version indicators includes extracting minor and patch portions of the first and second API version indicators and determining whether the minor and patch portions of the first API version indicator are equal to the minor and patch portions of the second API version indicator.

According to yet another aspect of the subject matter described herein, decoding the first and second API version indicators includes extracting optional operator-specified portions of the first and second API version indicators and determining whether the optional operator-specified portion of the first API version indicator is equal to the optional operator-specified portion of the second API version indicator.

According to yet another aspect of the subject matter described herein, determining that the first service instance is backward compatible with the second service instance includes determining that the first API version indicator has a higher numeric value than the second API version indicator.

According to yet another aspect of the subject matter described herein, implementing the canary testing includes determining published traffic capacities of the first and second service instances and sending a mix of traffic to the first and second service instances in accordance with the published traffic capacities.

According to yet another aspect of the subject matter described herein, implementing the canary testing includes sending an operator configured proportion of traffic to the first and second service instances.

According to yet another aspect of the subject matter described herein, the process of canary testing includes receiving, from a network function repository function (NRF) and during the canary testing, updated capacities for the first and second service instances and dynamically changing the relative amounts of traffic being sent to the first and second service instances during the canary testing.

According to yet another aspect of the subject matter described herein, after completing the canary testing successfully, Producer NF can gradually increase the load from older release to new release, by updating the NRF registration at runtime. Similarly, if canary testing indicates that live traffic fails on the new service instance, then the producer NF can shift the load back to older release, by updating the NRF registration at runtime According to yet another aspect of the subject matter described herein, a system for handling multiple instances of a service provided by one or more producer network functions (NFs) is provided. The system includes a service based architecture (SBA) platform including at least one processor and a memory. The system further includes an application programming interface (API) decoder for obtaining first and second application programming interface (API) version indicators associated with first and second service instances implemented by one or more producer NFs, decoding the first and second API version indicators, and detecting, based on results of the decoding, multiple instances of the same service and that a first service instance is backward compatible with a second service instance. The system further includes a canary tester for, responsive to the API decoder detecting that the first and second service instances implement multiple versions of the same service (from a single producer NF) and that the first service instance is backward compatible with the second service instance, implementing canary testing of the first service instance.

According to yet another aspect of the subject matter described herein, the canary tester is configured to receive (through NRF subscribe and notify procedures), from a network function repository function (NRF) and during the canary testing, updated capacities for the first and second service instances and dynamically change the relative amounts of traffic being sent to the first and second service instances during the canary testing.

According to yet another aspect of the subject matter described herein, the SBA platform is configured to, in response to completing the canary testing, load share traffic between the first and second service instances.

According to yet another aspect of the subject matter described herein, wherein the first and second service instances provide a 5G network service.

According to yet another aspect of the subject matter described herein, a non-transitory computer readable medium having stored thereon executable instructions that when executed by a processor of a computer controls the computer to perform steps is provided. The steps include, at a service based architecture (SBA) platform including at least one processor and a memory, obtaining first and second application programming interface (API) version indicators associated with first and second service instances implemented by one or more producer NFs. The steps further include decoding the first and second API version indicators. The steps further include detecting, based on results of the decoding, multiple instances of the same service and that a first service instance is backward compatible with a second service instance. The steps further include implementing canary testing of the first service instance.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Current 3GPP specifications for 5G (i.e., 3GPP TS 29.510, "$3^{rd}$ Generation Partnership Project; Technical Specification Group Core Network and Terminals; 5G System; Network Function Repository Services; Stage 3" (December 2018), the disclosure of which is incorporated herein by reference in its entirety) allow the NF to register one or more supported service profiles (NFService) with the NRF. Such registration is to support the following:

1. An NF may have one or more supported services. In order to register all supported services, the NF can use a single registration message.
2. An NF may have one or more instances of the same service. Multiple service instances may have:
   a) The same API version but different fully qualified domain names (FQDNs) (i.e., one or more sets of micro-services for the same service);
   b) Different API versions with the same FQDN (i.e., multiple service instances that are part of the same micro-service); and/or
   c) Different API-versions with different FQDNs (i.e., multiple instances of the same service that are part of different micro-services.

Examples of services that may be provided by NFs include any of the services described above with respect to FIG. 1. For example, a PCF NF may provide policy services for subscribers. The network operator operating the NF may desire to implement a new version of policy services and test the new version gradually with live network traffic while continuing to process the bulk of network traffic using the existing version of the software implementing the policy services. In such a case, the NF would register two different versions of the policy services. However, because 5G specifications to not specify how consumer NFs should handle multiple instances of the same service, such testing would require that each consumer NF be configured to gradually phase traffic in to the new NF until it is fully tested. Requiring individual consumer NFs to handle the testing and routing of traffic to multiple instances of the same service is unscalable, especially in light of the large numbers of NFs that may be present in a network.

Figure 2:
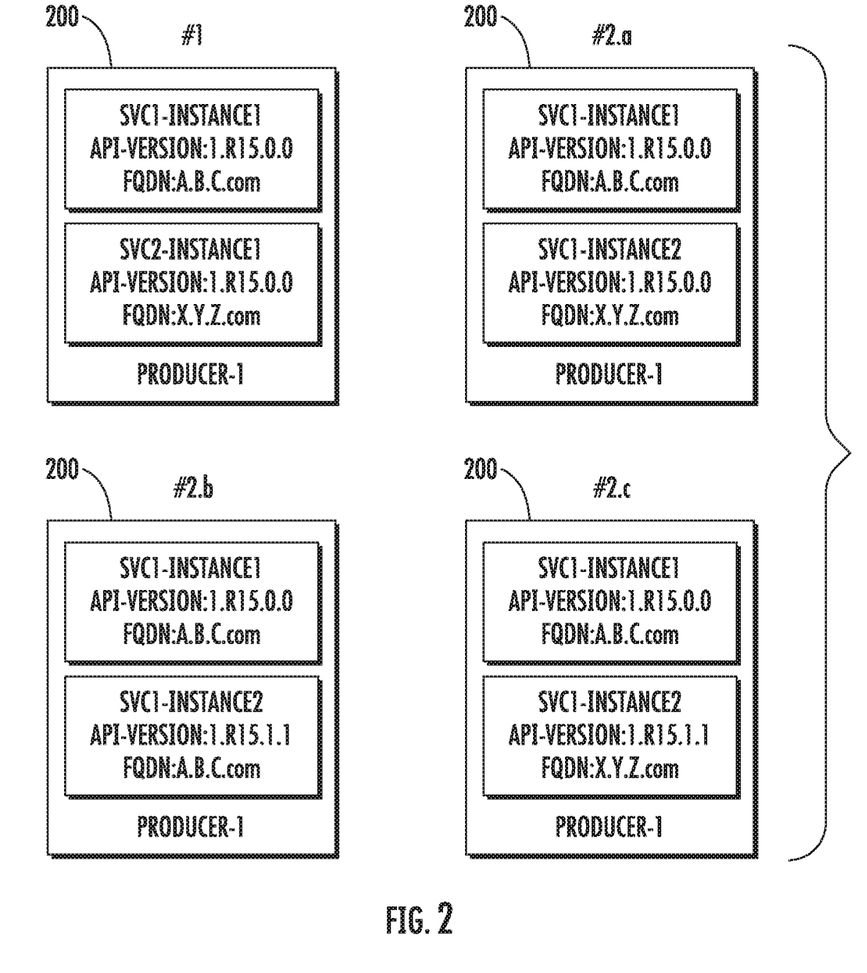
FIG. 2 is a block diagram of different examples of multiple instances of the same service provided by a producer NF.

FIG. 2 illustrates four different examples of a producer NF 200 that implements multiple services. In example #1, producer NF 200 implements two different services, Svc1 and Svc2. The services have the same API version 1.R15.0.0 and different FQDNs of X.Y.Z.com and A.B.C.com. In example #2a, producer NF 200 implements two different instances (instance1 and instance2) of the same service Svc1. The service instances have different FQDNs of A.B.C.com and X.Y.Z.com, respectively. In example #2.b, producer NF 200 implements two instances, instance1 and instance2, of the same service Svc1. The service instances have different API versions 1.R15.0.0 and 1.R15.1.1. The service instances have the same FQDN value of A.B.C.com. In example #2.c, producer NF 200 implements two different instances, instance1 and instance2, of the same service Svc1. The different instances have different API versions of 1.R15.0.0 and 1.R15.1.1. The different service instances have different FQDN values of A.B.C.com and X.Y.Z.com. In examples #2.a, #2.b, and #2.c, because producer NF 200 implements multiple instances of the same service, there exists a need for testing and routing traffic to the multiple instances without requiring specialized routing functionality on consumer NFs or on the producer NFs.

There are many reasons why a producer NF may host multiple instances of the same service. Examples of such reasons are:

(a) Scaling service (illustrated by example #1 and example #2.a in FIG. 2): Even if cloud network architectures, such as Kubernetes (k8s), allow operators to scale a single instance of a scaling service, operators may, for other reasons (like different incompatible software architectures, etc.) wish to spawn a separate instance of a service and manage it separately.

(b) API version change (as captured by example #2.b and example #2.c in FIG. 2): Due to change in Major/Release/Minor/Patch version of API, a network equipment vendor or operator may want to test their service instance under real traffic (before tearing down the old service instance).

As stated above, 3GPP specifications do not define what actions consumer NFs should take when multiple instances of the same service are discovered. In one example, the consumer NF can execute complex logic to analyze the difference between multiple instances of the same service. For scaled service variants, consumer(s) may perform load-balancing between multiple service instances from the same provider NF. For API version changes, the consumer NF can analyze the type of API version change. For non-backward compatible API version instances, the consumer NF may treat the service instances separately for messaging. For backward compatible API version instances, the consumer NF may perform load balancing or canary testing between service instances. However, 3GPP specifications do not specify any of these options, and implementing such logic at each consumer NF increases the complexity of consumer NF design.

Figure 3:
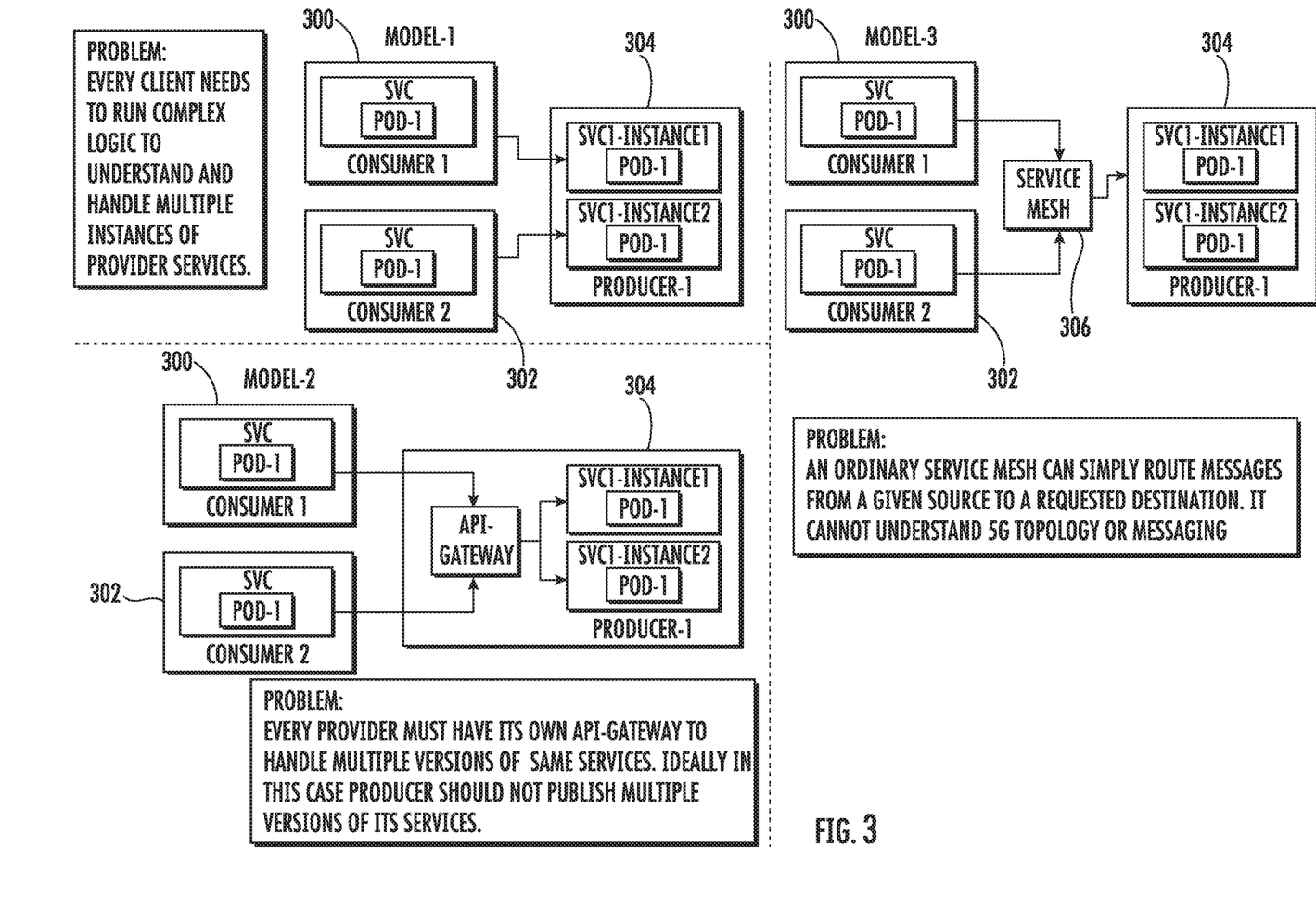
FIG. 3 is a block diagram illustrating example architectures for handling multiple instances of the same service provided by producer NFs.

FIG. 3 illustrates possible solutions for handling multiple versions of the same service. In FIG. 3, model 1 includes consumer NFs 300 and 302 that detect the need for a service Svc1 provided by producer NF 304. Consumer NFs 300 and 302 also detect that producer NF 304 provides multiple instances of the same service Svc1. In a consumer-NF-centric solution, each consumer NF 300 and 302 would implement complex logic for testing and routing traffic to the different instances of the same service provided by producer NF 304. Such a solution is undesirable for the reasons set forth above.

In model 2 in FIG. 3, consumer NFs 300 and 302 detect the need for a service Svc1 provided by producer NF 304. Producer NF 304 provides two instances of the service Svc1. However, producer NF 304 does not publish the fact that producer NF 304 publishes that it provides multiple instances of the service Svc1. Producer NF 304 includes an internal API gateway to handle routing of traffic to the different service instances. One problem with this approach is that it requires each producer NF to implement an API gateway to handle the multiple instances of the same service. Such a solution is not scalable with large numbers of producer NFs and results in increased complexity of producer NF design. Also, with increased performance requirements for a given producer NF, the API gateway will become single point of failure and contention point as well.

In model 3 in FIG. 3, consumer NFs 300 and 302 detect the need for a service Svc1 provided by producer NF 304. Producer NF 304 provides two instances of the service Svc1. A service mesh node 306 receives messages from consumer NFs 300 and 302 and routes the messages to producer NF 304. However, generic platform service mesh node 306 is incapable of recognizing that producer NF 304 provides multiple instances of the same service or of adjusting the traffic flow to such instances.

The subject matter described herein reduces the need for such complexity in consumer NF design by providing a service based architecture (SBA) node that detects, on behalf of a consumer NF, multiple instances of the same service provided by one or more producer NFs, detects the presence of service instances with backward compatible API versions, and implements canary testing of the service instances with backward compatible API versions. The same logic can be followed by consumer NFs in model 1 illustrated in FIG. 3. However, implementing multiple service instance handling at an SBA platform is believed to be advantageous over implementing multi-service instance detection, testing and routing at a consumer NF for scalability and complexity reasons. For non-backward compatible service instances, the SBA platform forwards the messages to the service instance requested by the consumer NF.

When the SBA platform detects multiple instances of the same service, the SBA platform can, based on operator configuration, implement canary testing of the new software and perform load sharing of traffic among the service instances once the canary testing has been completed. Canary testing of new software may include performing a gradual shift of traffic from the old version to the new version of the service. When a software vendor de-registers either version of the service, the SBA platform may switch all of the traffic to the remaining service instance or instances. Once canary testing is complete, and if multiple service instances remain, the SBA platform may load share traffic among the service instances.

Figure 4:
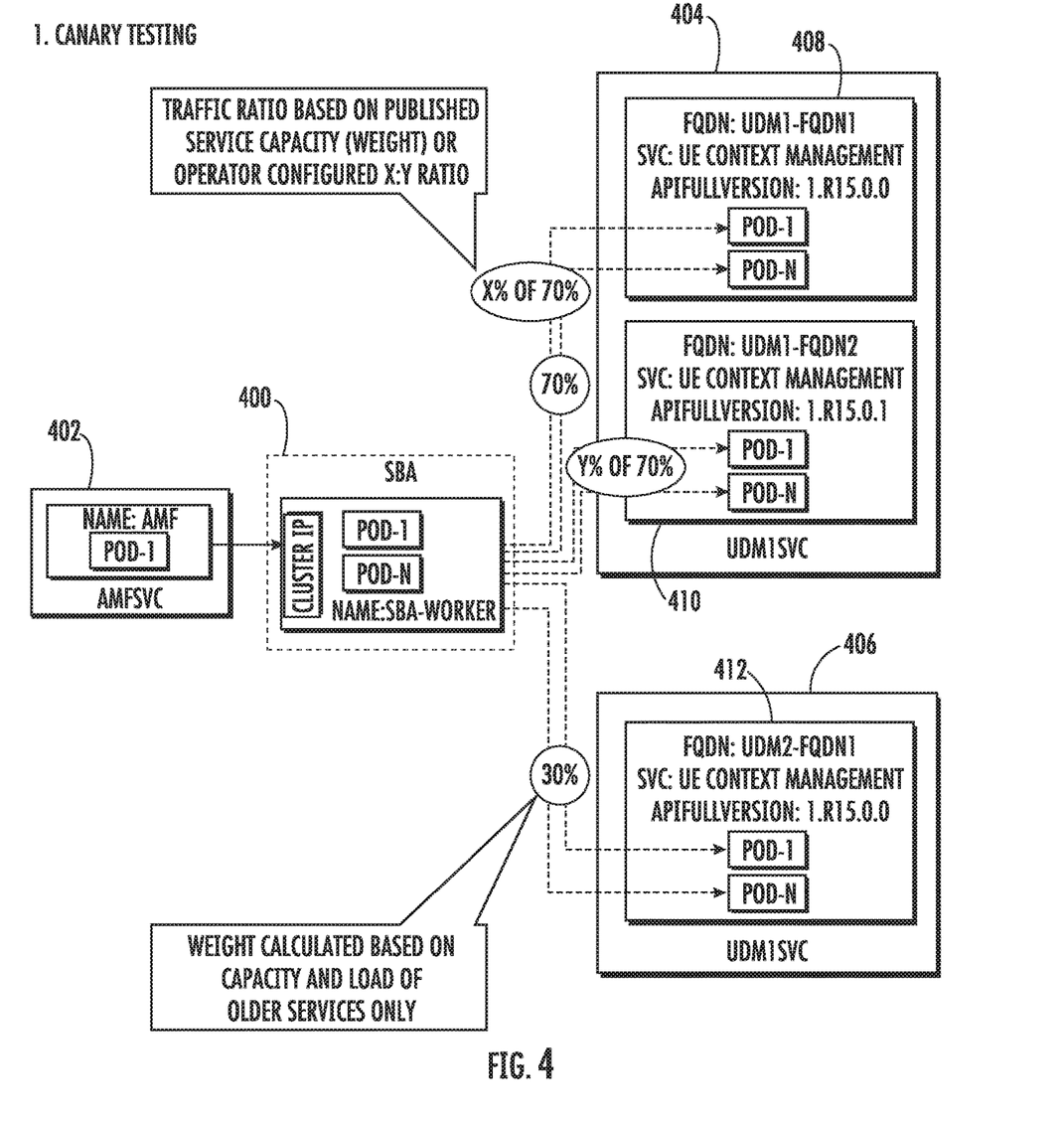
FIG. 4 is a network diagram illustrating a service based architecture (SBA) platform, such as a 5G SEPP or SCP node, for detecting multiple instances of the same service and for performing canary testing of a new instance of the service.

FIG. 4 is a network diagram illustrating an SBA platform that detects multiple instances of the same service and implements canary testing of the new service instances. Referring to FIG. 4, an SBA platform 400 is connected between a consumer NF 402, which in the illustrated example is an AMF, and producer NFs 404 and 406. Producer NF 406 implements two instances of a UE context management service, which is provided by a UDM. The service instances have different FQDN values udm1-fqdn1 and udm-fqdn2. The service instances have different API version indicators. For example, service instance 408 has an API version indicator of 1.R15.0.0, and service instance 410 has an API version indicator of 1.R15.0.1. Producer NF 406 also implements an instance 412 of the UE context management service. Service instance 412 has an FQDN value of udm2-fqdn1, which is different from the FQDNs of instances 408 and 410. Instance 412 has an API version indicator of 1.R15.0.0, which is the same API version indicator as instance 408.

In operation, SBA platform 400 detects a need for a service to be provided to consumer NF 402 in response to receiving a message from consumer NF 402. In this example, it is assumed that consumer NF 402 requires UE context management service. In response to receiving the message, SBA platform 400 may query an NRF (not shown in FIG. 4) to identify service instances capable of providing the UE context management service. The NRF responds with the FQDNs and API version indicators illustrated in FIG. 4. That is, the NRF may respond with (udm1-fqdn1, 1.R15.0.0) for service instance 408, (udm1-fqdn2, 1.R15.0.1) for service instance 410, and (udm2-fqdn1, 1.R15.0.0) for service instance 412.

SBA platform 400 parses the FQDNs and API version indicators and determines the following:
1) Service instances 408, 410, and 412 are instances of the same service;
2) Service instances 408 and 412 implement a current version of the service; and
3) Service instance 410 implements a new version of the service that is backward compatible with the current version of instance 408 provided by producer NF 404.

In response to detecting multiple instances of the same service and at least one new version that is backward compatible with a current version of the service, SBA platform 400 implements canary testing of the new version of the service provided for producer NF 404.

Once SBA platform 400 determines that canary testing should be enabled on two instances of the same service, the next step is to find the traffic ratio to send to the service instances 408 and 410. In order to find the traffic ratio, SBA platform 400 may first rely on the published capacities of the service instances. The capacities of the service instances are published by the service instances using a weight parameter that the service instances send to the NRF in a registration message. Using the published capacities, producer NFs can define the traffic split between old and new service instances. A producer NF can gradually increase/decrease the load from an older release to a newer release by specifying weight in their updated Service profile request to the NRF registration at runtime. An example of dynamically increasing the load from the old service instance to the new service instance will be provided below.

In implementing canary testing using published capacity first, if both instances of the same service have published their capacity (i.e. weight) parameter individually (in an NRF registration message), then the traffic ratio should be determined based on published capacity. For example, if instance1 (older) has published the capacity of 19000 and instance 2 (newer) has published the capacity of 1000. Then the canary testing may be performed using a traffic split of 19000:1000 i.e., 95:5. If either or both instances do not have a published capacity, then an operator defined ratio X (for the older version):Y (for the newer version) ratio may be used for canary testing. A default traffic ratio, such as 95:5, can be provided during deployment of NF instances.

In FIG. 4, SBA platform 400 determines that 70% of the service traffic should be routed to service instance 408 and 30% should be routed to service instance 412, both of which implement the current or older version of the service. This determination may be made based on the requests received from consumer NF or based on published capacities and load of older service instances 408 and 412 only. Of the 70% of traffic that should be routed to older service instance 408, SBA platform 400 routes X % of 70% (i.e. overall traffic destined for producer 404) to service instance 408 and Y % of 70% to new service instance 410. X and Y may be percentages determined based on published service capacity (weight) or based on an operator configured ratio.

As stated above, in order to determine whether to implement canary testing, SBA platform 400 must first identify that multiple versions of the same service are present and that at least one version is backward compatible with an existing version. To make such a determination, SBA platform 400 must parse the API version indicator obtained from the NRF for each service instance. The specification for API version indicators that may be used by SBA platform 400 in parsing the API version indicators received from the NRF is found in 3GPP TS 29.501, v15.2.0, "3$^{rd}$ Generation Partnership Project; Technical Specification Group Core Network and Terminals; 5G System; Principles and Guidelines for Services Definition; Stage 3," (Release 15) (December 2018), the disclosure of which is incorporated herein by reference in its entirety. According to 3GPP TS 29.501, the API version is defined as follows:

API version numbers shall consist of at least 4 fields, following a MAJOR.MINOR.PATCH pattern as described in the Semantic Versioning Specification (https://semver.org) with enhancements to cover branches due to 3GPP Releases. Optionally, additional fields can be added after the fourth (PATCH) field.

1$^{st}$ Field (MAJOR): This numerical field shall be incremented when one or more backward incompatible changes to the API are implemented.

2$^{nd}$ Field (Release): This field corresponds to a 3GPP release and indicates whether the 3GPP release is still under development. For a 3GPP release that is not yet frozen (i.e., still under development), the field shall take the form "PreRn", where n is the 3GPP release number. For a 3GPP release that is frozen, the field shall take the form "Rn", where n is the 3GPP release number. When the first MAJOR, MINOR or PATCH change in a 3GPP release is applied to an API, this number shall be set according to that 3GPP release. When a 3GPP release is being frozen and a "PreRn" release field is assigned to an API, the release field shall be converted to "Rn", If no change is applied to an API in a new 3GPP release, the API will maintain the release field of the last 3GPP release where it was changed.

3$^{rd}$ Field (MINOR): This numerical field shall be incremented if one or more functionalities are added to the API in a backward compatible manner. This field shall be reset to "0" if the 1$^{st}$ or 2$^{nd}$ field is changed.

4$^{th}$ Field (PATCH): This numerical field shall be incremented if one or more corrections are made to the OpenAPI (https://github.com/OAI/OpenAPI-Specification/blob/master/versions/3.0.0.md) without requiring any change to the API. This field shall be reset to "0" if the 1$^{st}$ 2$^{nd}$, or 3$^{rd}$ field is changed.

SBA platform 400 may parse the API version indicator received from the NRF to identify a backward compatible version of the same service. Detecting a backward compatible version may include utilizing the API version structure defined in 3GPP TS 29.501 to identify major, minor, and patch portions of the API version indicator published by each NF. According to 3GPP TS 29.501, changes in the minor or patch version represent backward compatible changes of a 5G service. Accordingly, when SBA platform 400 detects a change in the minor or patch version in an API version indicator, SBA platform 400 may determine that a backward compatible version of a service instance is present.

In addition, the API version specification allows the operator to add any additional information after the fourth field. In one example, a producer NF may publish the software release version in the semver compatible format in a field following the patch field. If the software release is included in a field following the patch field, SBA platform 400 may utilize the software release to identify backward compatible changes in software releases. SBA platform 400 may also use a change in the software version specified in the minor or patch field to detect a backward compatible change in software version.

In one example, the API version indicator published by a producer NF may be as follows:

MAJOR.Release.MINOR.PATCH.{Software Major.Minor.Patch}

In the above-listed API version example, MAJOR.RELEASE.MINOR.PATCH is the 3GPP TS 29.501 specified API version indicator. The portion {software Major.Minor.Patch} is the additional information portion that may be published by a producer NF. The following are examples of API version indicators and the corresponding meanings that may be determined by SBA platform 400:

e.g., API version: 0.R15.0.0 means:
3GPP version: Major=0, Release=15, Minor=0, Patch=0, But no provided specified software version e.g., API version: 0.R15.0.1.8.15.0 means:
3GPP version: Major=0, Release=15, Minor=0, Patch=1, With software version as 8.15.0 20

Figure 5:
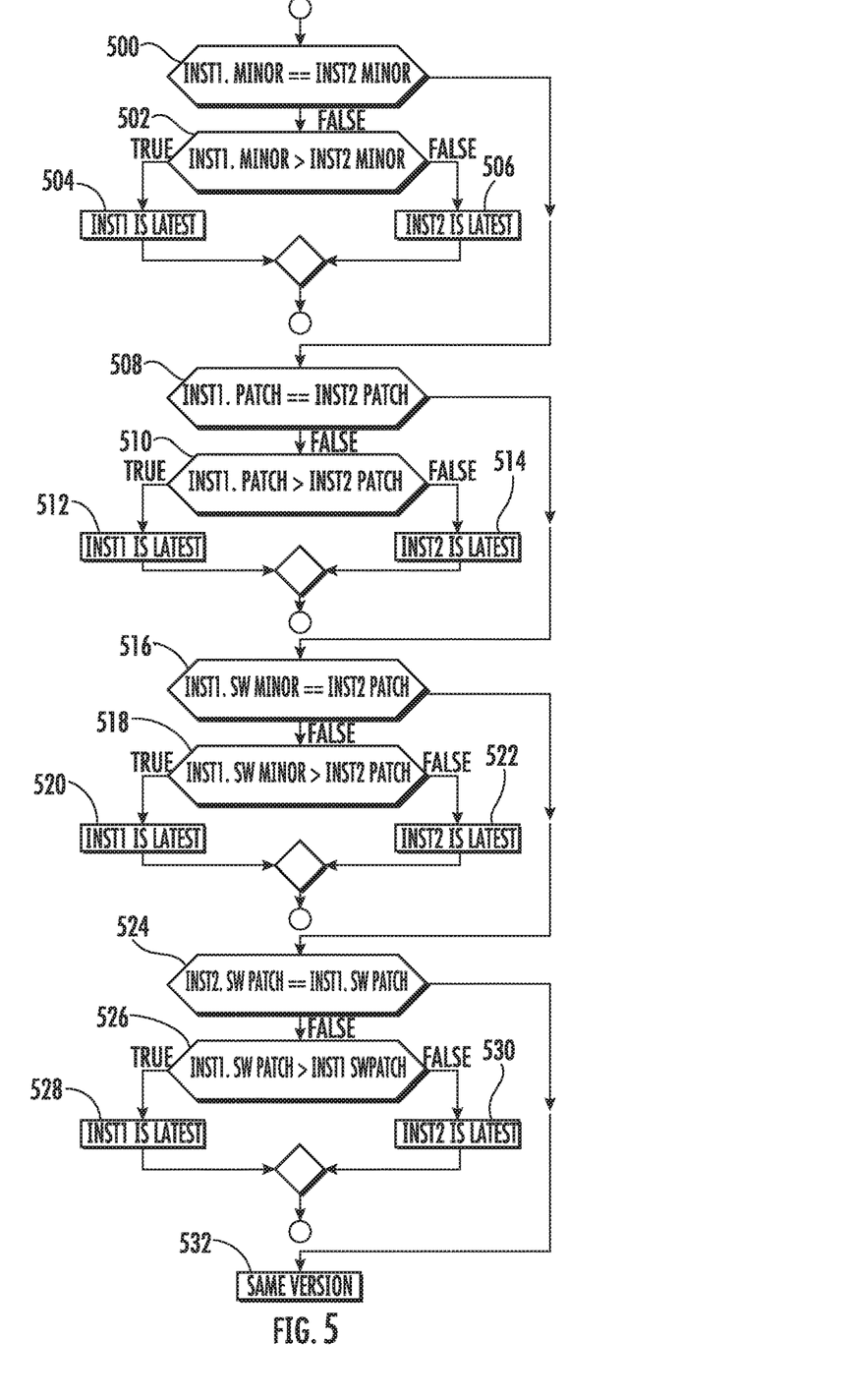
FIG. 5 is a flow chart illustrating an exemplary process for detecting multiple instances of the same service and for identifying a new instance of a service.

In summary, to enable canary testing, SBA platform 400 may do the following:

1. Confirm the following for both instances of the same service:
   apiPrefix, scheme, priority and apiVersionInUri for both service instances should be the same
   both service instances should have different FQDNs
   both service instances should have different Minor or Patch version in 3GPP defined version or producer defined software version
   both service instances should have same MAJOR and Release version 2. Identify the service as old vs. new.
   Service with a lower version is considered as old.
   Logic to find the lower version is explained below with respect to FIG. 5. In FIG. 5, Inst1 refers to instance1 of a service and Inst2 refers to instance2 of the service, which at the outset of the process in FIG. 5 is not known to be the same or a different version.

3. SBA platform 400 may consider the capacity and load of the older service instance when performing load distribution between the same services in multiple NFs.

FIG. 5 is a flow chart illustrating exemplary logic that may be implemented by SBA platform 400 in determining whether instances of a service implement the same or a different version of the service and, if different, which instance implements the newer version of the service. Referring to FIG. 5, in step 500, SBA platform 400 determines whether the minor portion of the API version indicator of the first instance of the service is the same as the minor portion of the API version indicator of the second instance of the service. If the minor portions are not equal, control proceeds to step 502 where it is determined whether the numeric value of the minor portion of the API version indicator of the first instance of the service is greater than the numeric value of the minor portion of the API version indicator of the second instance of the service. If the minor portion of the API version indicator of instance 1 is greater, control proceeds to step 504 where instance 1 is recorded as the latest version of the service. If the numeric value of the minor portion of the API version indicator of instance 2 is greater, control proceeds to step 506 where instance 2 is recorded as the latest version of the service. Once the latest version of the service is determined after step 504 or 506, canary testing of the latest version instance may begin.

If the minor portion of the API version indicator of instance 1 is equal to the minor portion of the API version indicator of instance 2 of the service, control proceeds to step 508 where it is determined whether the patch portion of the API version indicator for instance 1 of the service is equal to the patch portion of the API version indicator for instance 2 of the service. If the patch portions are not equal, control proceeds to step 510 where it is determined whether the numeric value of the patch portion of the API version indicator for instance 1 of the service is greater than the numeric value of the patch portion of the API version indicator for instance 2 of the service. If the numeric value of the patch portion of the API version indicator for instance 1 of the service is greater, control proceeds to step 512 where instance 1 is recorded as the latest version of the service. If the value of the patch portion of the API version indicator for instance 2 is greater, control proceeds to step 514 where instance 2 is recorded as the latest version of the service. After step 512 or 514, canary testing may begin for the service instance that is determined to be the latest version of the service.

Returning to step 508, if the patch portions of the API version indicators of the service are not equal, control proceeds to step 516 where SBA platform 400 determines whether the SW.minor portions of the API version indicators of the service instances are equal. The SW.minor portions are the portions following the patch portions that contain optional operator-specified content. If the SW.minor portions are not equal, control proceeds to step 518 where it is determined whether the numeric value of the SW.minor portion of the API version indicator for instance 1 of the service is greater than the numeric value of the SW.minor portion of API version indicator for instance 2 of the service. If the numeric value of the SW.minor portion of the API version indicator of instance 1 of the service is greater, control proceeds to step 520 where instance 1 is recorded as the latest version of the service. If the numeric value of the SW.minor portion of the API version indicator for instance 2 is greater, control proceeds to step 522 where instance 2 is recorded as the latest version of the service. After step 520 or step 522, canary testing begins.

In step 516, if SBA platform 400 determines that the SW.minor portions of the API version indicators of the service instances are equal, control proceeds to step 524 where the SW.patch portions of the API version indicators of the first and second service instances are compared. The SW.patch portions are part of the optional operator-specified portion of the API version indicators described above. If the SW.patch portions are not equal, control proceeds to step 526 where it is determined whether the numeric value of the SW.patch portion of the API version indicator for instance 1 of the service is greater than the numeric value of the SW.patch portion of the API version indicator for instance 2 of the service. If the numeric value of the SW.patch portion of the API version indicator of instance 1 of the service is greater than the numeric value of the SW.patch portion of the API version indicator of instance 2 of the service, control proceeds to step 528 where instance 1 is recorded as the latest version of the service. If the numeric value of the SW.patch portion of the API version indicator for instance 2 of the service is greater, control proceeds to step 530 where instance 2 is recorded as the latest version. After step 528 or step 530, canary testing begins.

In step 524, if the SW.patch portions of the API version indicators of the service instances are the same, control proceeds to step 532 where the service instances are determined to be the same version of the service. If the service instances are determined to be the same versions of the service because the API version indicators match, SBA platform 400 may bypass canary testing and load share service traffic among the service instances based on the published capacities of the service instances or based on an operator configured traffic ratio.

Figure 6:
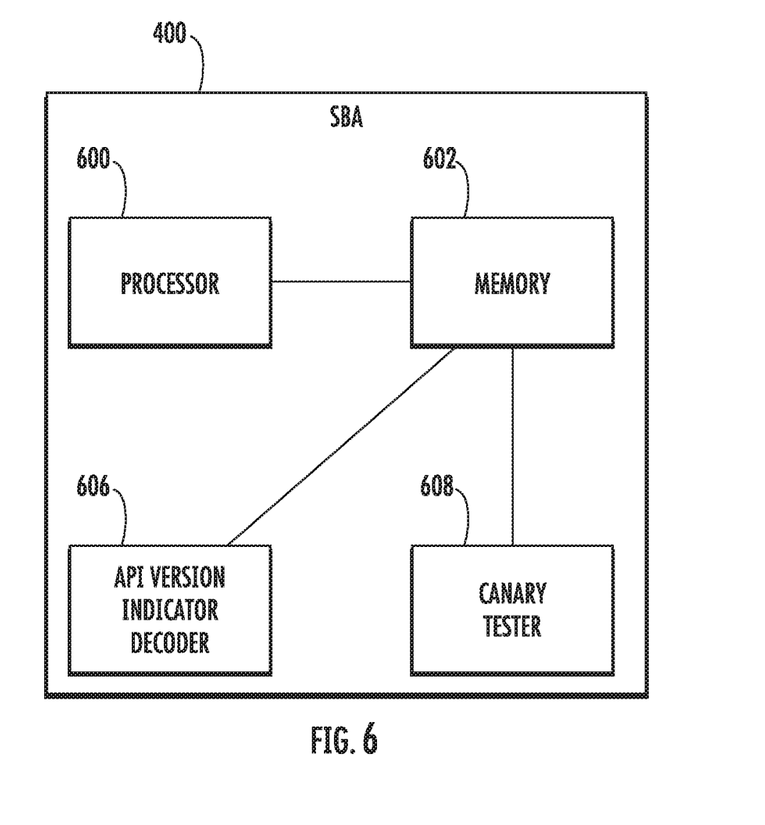
FIG. 6 is a block diagram of an exemplary SBA platform for detecting multiple instances of the same service and for implementing canary testing of newer instances of a service.

FIG. 6 is a block diagram illustrating an exemplary architecture for SBA platform 400. Referring to FIG. 6, SBA platform 400 includes at least one processor 600 and a memory 602. An API version indicator decoder 604 obtains API version indicators from an NRF, decodes the API version indicators and detects, based on results of decoding that a first service instance is backward compatible with a second service instance. API version indicator decoder 604 may perform the described above with respect to decoding the minor, patch, and optional portions of API version indicators to make this determination. SBA platform 400 may also include a canary tester 606 that implements canary testing in response to the determination that multiple instances of the same service are present and that one service instance is backward compatible with another service instance. As described above, canary testing may include identifying a mix of traffic to be transmitted to the old and new service instances and gradually increasing the traffic to the new service instances based on messages received at runtime.

Figure 7:
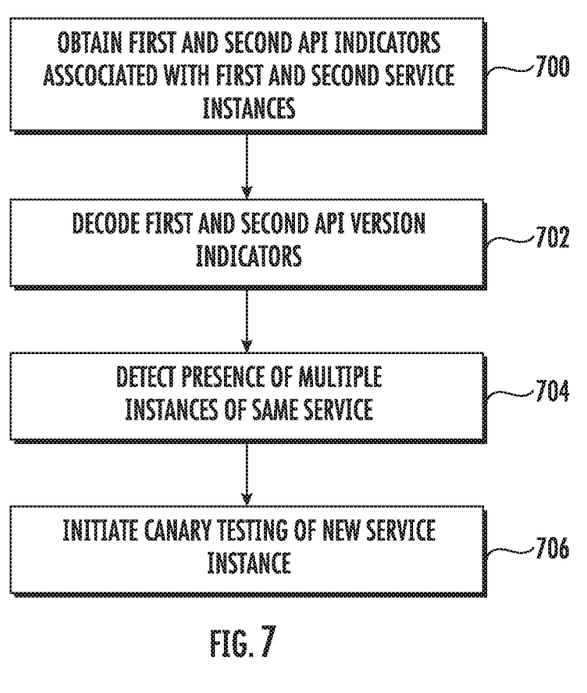
FIG. 7 is a flow chart illustrating an exemplary process for detecting multiple instances of a service and for implementing canary testing of a new instance of a service.

FIG. 7 is a flow chart illustrating an exemplary process for handling multiple instances of a service provided by producer NFs in a network. Referring to FIG. 7, in step 700, first and second API version indicators associated with first and second service instances are obtained. The API version indicators may be obtained by sending a message to an NRF. An example of such a message is illustrated by lines 1 and 2 of the message flow diagram in FIG. 8. In line 1 of FIG. 8, SBA platform 400 sends an NFSubscribe message to NRF 800. The NFsubscribe specifies the service for which SBA platform 400 is requesting information. In line 2, NRF 800 responds an NFStatusNotify message that contains the API version indicators and capacities of each instance of the service.

Returning to FIG. 7, in step 702, the API version indicators are decoded. The decoding may occur as described above with respect to FIG. 5 to detect whether or not multiple instances of the same service are present and identify the latest service instance. In FIG. 7, it is assumed that multiple instances of the same service are present. Accordingly, in step 704, SBA platform 400 detects the presence of multiple instances of the same service and that one service instance is backward compatible with another service instance. This step may also be performed as described above with respect to FIG. 5.

Figure 8:
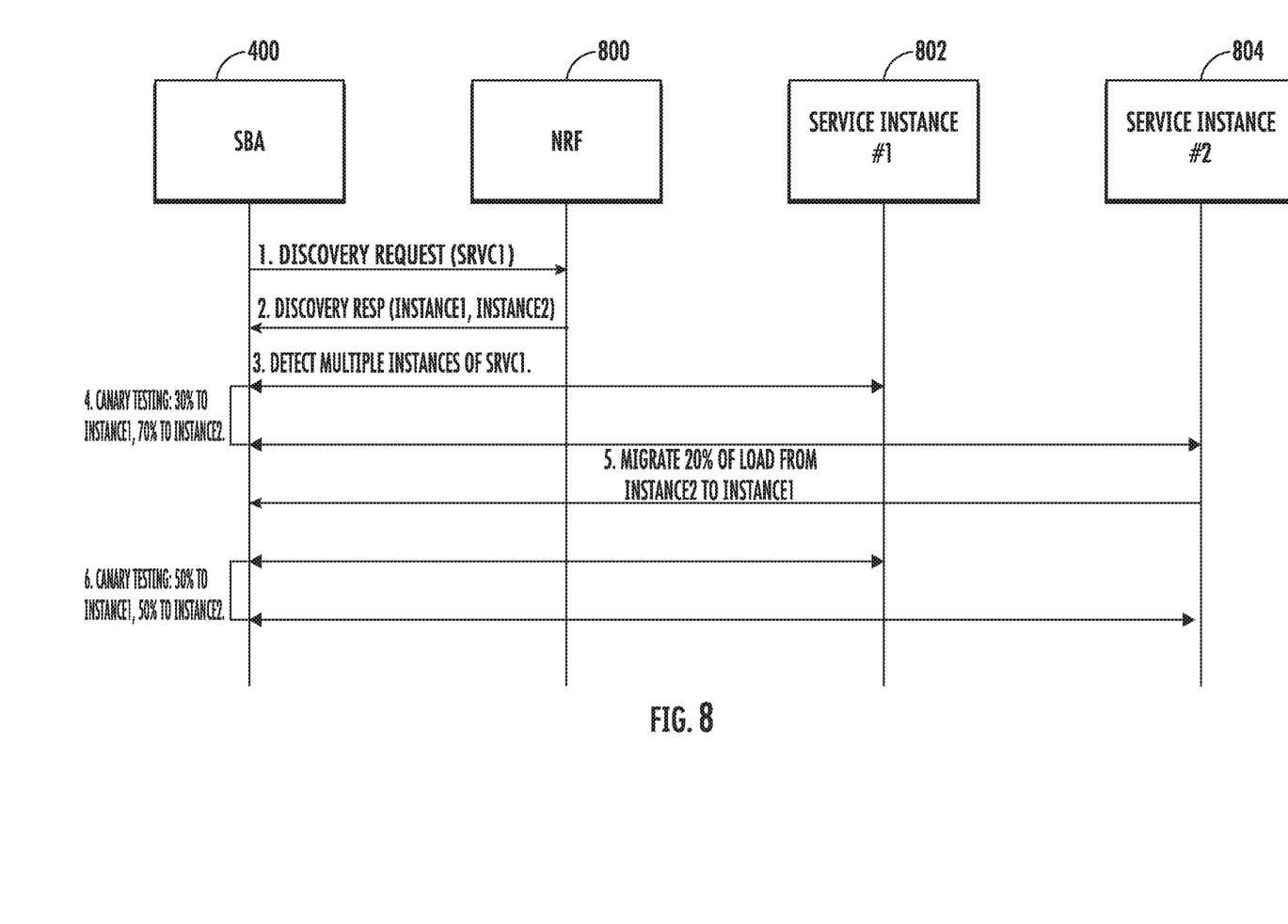
FIG. 8 is a flow diagram illustrating exemplary messaging exchanged between an SBA platform, an NRF, and service instances for detecting multiple instances of a service, for implementing canary testing of a newer instance of a service, and for dynamically adjusting the traffic mix between service instances at runtime during the canary testing.

In step 706, canary testing of the latest version of the service instance is implemented. An example of such canary testing is illustrated in FIG. 8. Returning to FIG. 8, after SBA platform 400 detects the presence of multiple instances of the same service in line 3, control proceeds to line 4 where canary testing of instance 1 802 (the newer instance) is performed with 70% of the traffic being routed to the older instance 2 804 and 30% of the traffic being routed to the newer instance 802. The traffic mix may be based on published capacities of service instances 802 and 804 using the weight parameters obtained from NRF 800. In an alternate implementation, the relative traffic weights sent to service instances 802 and 804 during the canary testing may be based on an operator configured traffic ratio.

In lines 5 and 6 of the message flow diagram, instances 802 and 804 publish new traffic weights to NRF 800 to increase the load on instance 1. The new weights may be communicated to NRF 800 in NFStatusUpdate messages (as defined in 3GPP TS 29.510 specification of the NRF). In line 7, NRF 400 communicates the new traffic weights to SBA platform 400 in an NFStatusNotify message. In response to receiving the new weights of the service instances, in line 8 of the message flow diagram, SBA platform 400 continues the canary testing with the increased load on instance 802. The traffic load on instance 802 may be gradually increased by having instances 802 and 804 periodically update their capacities to NRF 800 until the desired operational mix of traffic between instances 802 and 804 is achieved.

Figure 9:
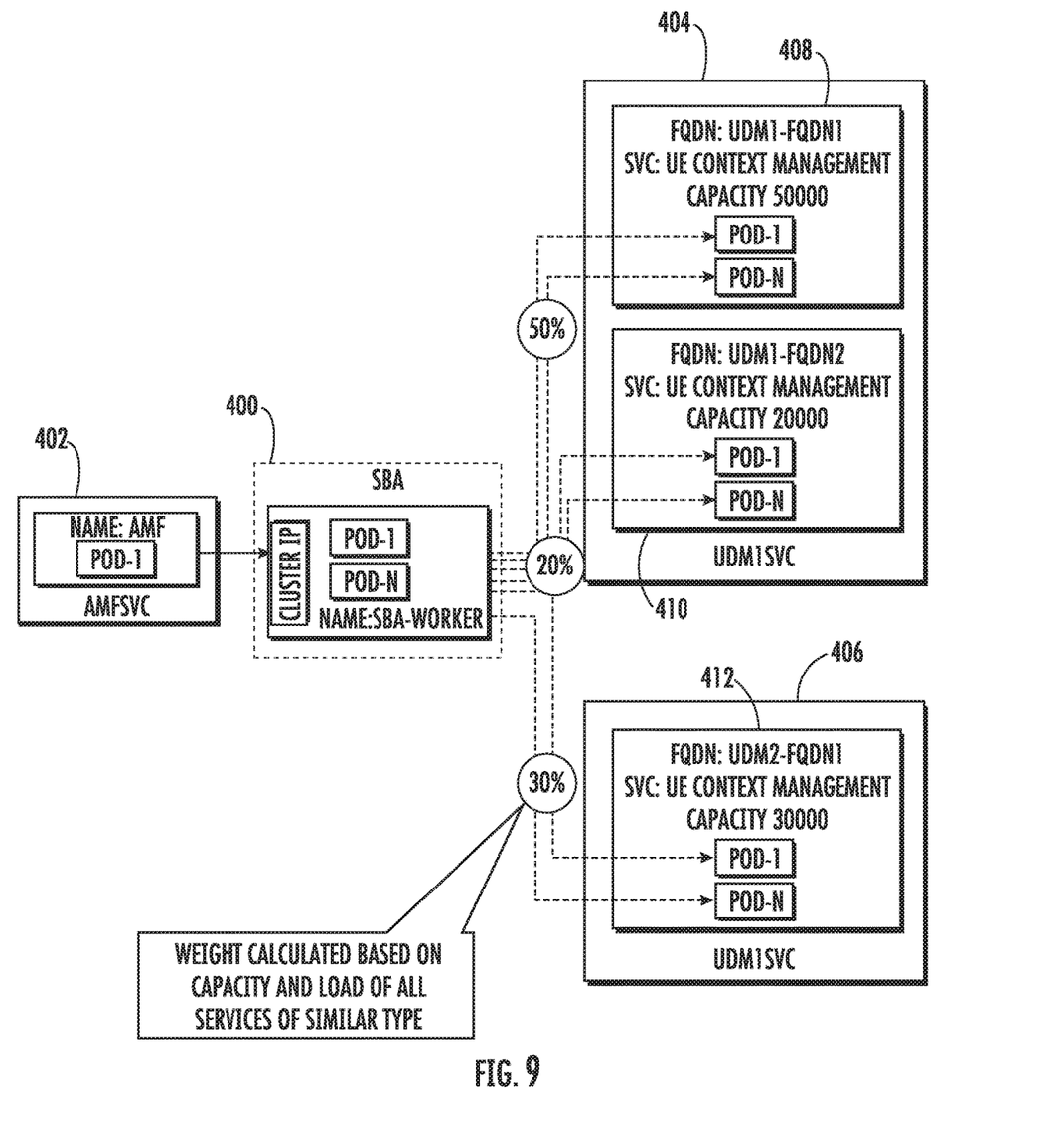
FIG. 9 is a network diagram illustrating an SBA platform load balancing traffic between multiple instances of a service.

FIG. 9 is a network diagram illustrating load balancing of traffic among service instances providing the same service using SBA platform 400. In FIG. 9, producer NF 404 hosts instances 408 and 410 of the UE context management service, and producer NF 406 hosts instance 412 of the UE context management service. The published capacities of instances 408, 410, and 412 are 50000, 20000, and 30000, respectively. Accordingly, once SBA platform 400 detects multiple instances of the UE context management service and completes canary testing of the new service instance(s), SBA platform 400 may load balance service traffic among the service instances based on the published capacities, which SBA platform 400 may obtain from the NRF. In the illustrated example, based on the published capacities, SBA platform 400 may route 50% of the UE context management traffic to service instance 408, 20% of the UE context management traffic to service instance 410, and 30% of the UE context management traffic to service instance 412.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for handling multiple instances of a service provided by one or more producer network functions (NFs), the method comprising:
   at a service based architecture (SBA) platform including at least one processor and a memory:
   obtaining first and second application programming interface (API) version indicators associated with first and second service instances implemented by one or more producer NFs;
   decoding the first and second API version indicators;
   detecting, based on results of the decoding, multiple instances of the same service and that a first service instance is backward compatible with a second service instance; and
   implementing canary testing of the first service instance.

2. The method of claim 1 wherein obtaining the first and second API version indicators includes sending a message to an NF repository function (NRF) and receiving the first and second API version indicators from the NRF in a message received from the NRF.

3. The method of claim 1 wherein decoding the first and second API version indicators includes extracting minor and patch portions of the first and second API version indicators and determining whether the minor and patch portions of the first API version indicator are equal to the minor and patch portions of the second API version indicator.

4. The method of claim 1 wherein decoding the first and second API version indicators includes extracting optional operator-specified portions of the first and second API version indicators and determining whether the optional operator-specified portion of the first API version indicator is equal to the optional operator-specified portion of the second API version indicator.

5. The method of claim 1 wherein determining that the first service instance is backward compatible with the second service instance includes determining that the first API version indicator has a higher numeric value than the second API version indicator.

6. The method of claim 1 wherein implementing the canary testing includes determining published traffic capacities of the first and second service instances and sending a mix of traffic to the first and second service instances in accordance with the published traffic capacities.

7. The method of claim 1 wherein implementing the canary testing includes sending an operator configured proportion of traffic to the first and second service instances.

8. The method of claim 1 comprising receiving, from an NF repository function (NRF) and during the canary testing, updated capacities for the first and second service instances and dynamically changing the relative amounts of traffic being sent to the first and second service instances during the canary testing.

9. The method of claim 1 comprising completing the canary testing, and, after completing the canary testing, load sharing traffic between the first and second service instances.

10. A system for handling multiple instances of a service provided by one or more producer network functions (NFs), the system comprising:
    a service based architecture (SBA) platform including at least one processor and a memory;
    an application programming interface (API) decoder implemented by the at least one processor for obtaining first and second application programming interface (API) version indicators associated with first and second service instances implemented by one or more producer NFs, decoding the first and second API version indicators, and detecting, based on results of the decoding, multiple instances of the same service and that a first service instance is backward compatible with a second service instance; and
    a canary tester implemented by the at least one processor for, responsive to the API decoder detecting that the first and second service instances implement multiple versions of the same service and that the first service instance is backward compatible with the second service instance, implementing canary testing of the first service instance.

11. The system of claim 10 wherein obtaining the first and second API version indicators includes sending a message to an NF repository function (NRF) and receiving the first and second API version indicators from the NRF in a message received from the NRF.

12. The system of claim 10 wherein decoding the first and second API version indicators includes extracting minor and patch portions of the first and second API version indicators and determining whether the minor and patch portions of the first API version indicator are equal to the minor and patch portions of the second API version indicator.

13. The system of claim 10 wherein decoding the first and second API version indicators includes extracting optional operator-specified portions of the first and second API version indicators and determining whether the optional operator-specified portion of the first API version indicator is equal to the optional operator-specified portion of the second API version indicator.

14. The system of claim 10 wherein determining that the first service instance is backward compatible with the second service instance includes determining that the first API version indicator has a higher numeric value than the second API version indicator.

15. The system of claim 10 wherein implementing the canary testing includes determining published traffic capacities of the first and second service instances and sending a mix of traffic to the first and second service instances in accordance with the published traffic capacities.

16. The system of claim 10 wherein implementing the canary testing includes sending an operator configured proportion of traffic to the first and second service instances.

17. The system of claim 10 wherein the canary tester is configured to receive, from an NF repository function (NRF) and during the canary testing, updated capacities for the first and second service instances and dynamically change the relative amounts of traffic being sent to the first and second service instances during the canary testing.

18. The system of claim 10 wherein the SBA platform is configured to, in response to completing the canary testing, load share traffic between the first and second service instances.

19. The system of claim 10 wherein the first and second service instances provide a 5G network service.

20. A non-transitory computer readable medium having stored thereon executable instructions that when executed by a processor of a computer controls the computer to perform steps comprising:

at a service based architecture (SBA) platform including at least one processor and a memory:
obtaining first and second application programming interface (API) version indicators associated with first and second service instances implemented by one or more producer NFs;
decoding the first and second API version indicators;
detecting, based on results of the decoding, multiple instances of the same service and that a first service instance is backward compatible with a second service instance; and
implementing canary testing of the first service instance.

* * * * *